Figure 1:
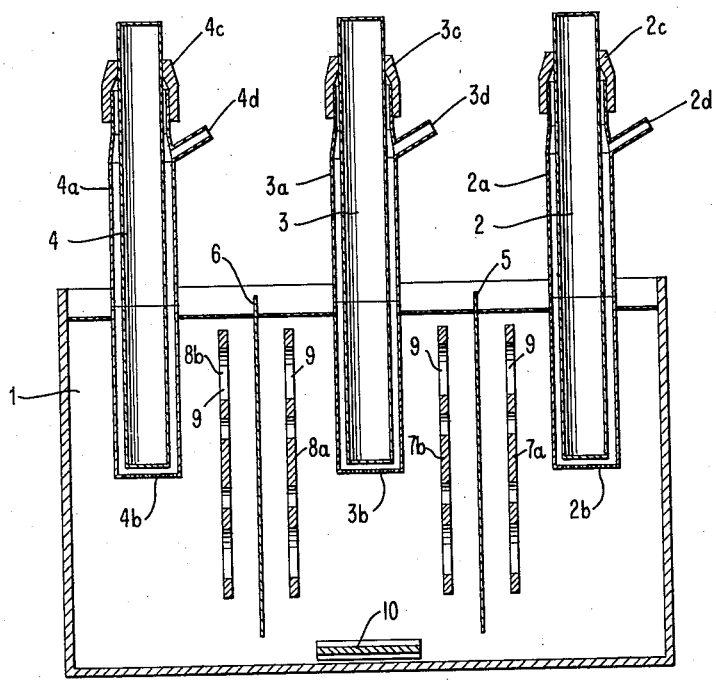

Oct. 29, 1963  R. BEAU  3,108,934
PROCESS FOR THE MANUFACTURE OF ANTIMONY OF HIGH PURITY
Filed April 10, 1961

INVENTOR.
RAYMOND BEAU
BY Bauer and Seymour
ATTORNEYS

United States Patent Office 3,108,934
Patented Oct. 29, 1963

3,108,934
PROCESS FOR THE MANUFACTURE OF
ANTIMONY OF HIGH PURITY
Raymond Beau, Massy, Seine-et-Oise, France, assignor to
Les Produits Semi-Conducteurs, Paris, France
Filed Apr. 10, 1961, Ser. No. 101,984
Claims priority, application France Feb. 15, 1961
14 Claims. (Cl. 204—105)

This invention relates to the manufacture of antimony of high purity and, in particular, substantially free of arsenic.

It is known that the manufacture of semi-conductors necessitates the employment of metallic elements or metalloids of high purity, and that such states of purity are hard to obtain, particularly in the case of antimony the purification of which is particularly difficult. It has been proposed to refine antimony by zonal fusion, a technique well known in the preparation of other pure metals, but the presence of arsenic does not permit an efficient and economic use of that process.

It is an object of this invention to separate arsenic and the other impurities found in association with antimony by a method particularly simple and thus to produce antimony of very high purity, substantially totally free of arsenic and of exceptional efficiency for the production of semi-conductors.

Another object is to provide novel apparatus which enables the novel process to be carried out with great efficiency.

The objects of the invention are accomplished generally speaking by a method of preparing antimony of high purity which comprises dissolving antimony oxide, $Sb_2O_3$, in an electrolyte and electrolytically separating arsenic and antimony from impurities, transforming the antimony to oxide and with the arsenic to trichloride and separating the arsenic from the antimony by distillation, dissolving the antimony trichloride in an electrolyte, and electrolytically separating it from residual impurities. In this novel process the following steps are carried out in succession:

A first electrolysis in a tartaric medium at low potential which eliminates impurities such as copper and bismuth, a second electrolysis in tartaric medium under a higher potential which produces a deposit of antimony still contaminated by arsenic, the dissolution of the contaminated arsenic and a distillation which first eliminates water and acid and which later eliminates the arsenic, and finally an electrolysis which separates the antimony from the last impurities.

According to the present invention antimony of high purity is prepared from commercial antimony oxide, $Sb_2O_3$, which can be derived from the purchase of oxide or by making the oxide from impure metallic antimony. The oxide is dissolved in an aqueous solution of tartaric acid and the solution obtained is subjected to a low intensity electrolysis, preferably on the order of 0.6 ampere. The difference in potential should be selected so that copper and bismuth present in the impurities are deposited at the cathode together with a minute quantity of antimony. In practice, the cathode potential may be in the neighborhood of —0.210 volt as measured by comparison with a calomel reference electrode.

The solution of antimony in tartaric medium from which the impurities bismuth and copper have been removed is then subjected to a second electrolysis, either by flowing it into a second chamber or by changing the electrodes in the first chamber, at a higher potential selected so that antimony and arsenic are deposited on the cathode while the other impurities such as iron, tin, zinc, silver, aluminum and nickel remain in the solution. This second electrolysis may be effectuated at a cathode potential of about —0.320 volt, measured with respect to a calomel electrode, the current being on the order of 6 amperes at the beginning of this step and falling to about 1.2 amperes at the end of this step.

The antimony recovered at the cathode is free of copper and bismuth but it still contains much arsenic as well as some impurities which have been intrained during the deposition of antimony on the cathode.

The antimony is removed from the cathode and oxidized, nitric acid being an effective oxidizing agent, producing antimony oxide, $Sb_2O_3$, insoluble in water. After washing with boiling water the oxide is put in concentrated hydrochloric acid solution whch produces arsenic trichloride from the arsenic. This solution is subjected to distillation during which the water-HCl azeotrope is eliminated. The arsenic chloride boils at about 130° C., is partly intrained by the azeotrope, and is distilled itself as the temperature rises being totally eliminated from the residual mass by the time it attains 220° C., the boiling point of antimony trichloride. After this elimination the distillation is stopped. During the course of this distillation it is advisable to have in the boiling mixture a small quantity of high purity antimony in order to prevent the formation of pentavalant antimony.

The antimony trichloride obtained by distillation, free of copper, bismuth and arsenic, is then given a last purification by electrolysis in order to separate the antimony from its last traces of impurity. This electrolysis is effectuated in a medium so chosen that the antimony is not compounded with the solvent medium. It has been found, and this is part of the invention, that a particularly appropriate medium for the final electrolysis is a mixture of hydrochloric and sulfuric acids. The sulfuric acid prevents the hydrolysis of antimony chloride which is favored by the high concentration of the solution. The sulfuric acid does not change the properties of the bath, which retains its non-reactive characteristic favorable to the separation of impurities by controlled voltage by electrolysis. Thus one obtains from the present invention crystalline, non-explosive antimony of high purity. The final electrolysis is preferably carried out in a solution containing from 10 to 50 grams per liter of antimony under the form of antimony trichloride in the presence of free hydrochloric acid of 1 N to 2 N concentration and of free sulfuric acid of concentration between 1 N and 4 N. During the final electrolysis one prefers to use a solution of antimony trichloride of 40 grams per liter in a mixture of hydrochloric acid and sulfuric acid 1.5 N and 3.3 N, respectively. With this solution one totally avoids the risk of hydrolysis in the electrolytic baths. The temperature may be maintained favorably around 25 to 30° C.

According to another characteristic of the invention it is advantageous during the final electrolysis to maintain the cathode potential between —180 and —190 millivolts measured as aforesaid. At these potentials the current densities are about 1 to 5 milliamperes per cm.$^2$.

The nature of the electrodes used is not critical for the operation of the final electrolysis but it is preferable to use pure antimony cathodes or platinum or tantalum cathodes on which the antimony deposits without forming alloys and from which it is readily detachable. When one uses platinum cathode it is preferable to use a reducing electrolytic bath containing a reducing agent such as hydroxylamine in order to prevent the release of pure chlorine capable of attacking the anode. One prefers to use habitually pure graphite anodes, for example 99.999% pure, which are not attacked by the bath.

It has been established that during this electrolysis hypochlorous acid forms and is reduced at the cathode producing a potential superior to that of the discharge of the cations $Sb^{+++}$, so that a large part of the electric current used during the electrolysis is employed in the reduction of this acid to the detriment of the deposit of antimony at the cathode.

This imperfection can be reduced by constructing the apparatus in which the final electrolysis is carried out in the manner set forth hereinafter.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
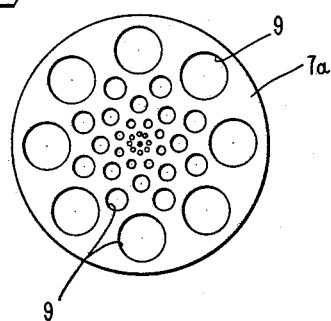

In the drawings, wherein like reference characters refer to like parts throughout the several views, FIG. 1 is a diagrammatic view partly in vertical section of the novel apparatus;

FIG. 2 is a detailed view of the screens forming a part of the apparatus.

The apparatus includes a tank 1, a plurality of graphite anodes 2, 3, 4 which are surrounded by glass diaphragms 2a, 3a, 4a which have a portion 2b, 3b, 4b which permits diffusion of the bath. The diffuse part of the diaphragms 2b, etc., may be composed of a plate of fritted glass disposed below the lower ends of the electrodes. The diaphragms 2a, 3a, 4a are sealed at 2c, 3c, 4c to the anodes by plastic joints. The diaphragms have lateral ports 2d, 3d, 4d which allow the escape of the chlorine formed during the electrolysis.

The cathodes such as 5 and 6 are of a classic type, of platinum for instance, and they are isolated from the anode compartments by screens 7a, 7b, 8a, 8b which have apertures 9, arranged somewhat as shown in FIG. 2, of small diameter at the center and increasing in size towards the rim. They are advantageously constructed of plastic plates and their centers are located approximately in line with the diffusion plates which lead to the electrodes. In this way equality of current density is assured over the whole surface of the cathodes during the electrolysis and is not concentrated at the centers thereof.

The tank is also provided with an agitator such as the magnetic agitator 10 which maintains the uniformity of the bath.

Into the anode compartments formed by the glass diaphragms is poured a mixture of sulfuric and hydrochloric acids containing no antimony chloride in solution. The density of the solution inside the diaphragms is slightly inferior to that of the electrolytic bath of mixed sulfuric and hydrochloric acids which fills the remainder of the apparatus. In this way, when the equilibrium of pressure is established between the anode and cathode compartments, there is an effective separation of the anode and cathode solutions and the hypochlorous acid formed remains localized in the anode compartments.

The following example illustrates the preferred form of the invention without imposing a limitation on the generalities which are elsewhere herein stated.

*Example*

One prepared 24 liters of a tartaric solution containing 40 grams per liter of antimony by dissolving 1160 grams of antimony oxide in an aqueous solution containing 160 grams per liter of commercial tartaric acid. This solution is electrolyzed in an electrolytic tank of plastic provided with 5 pure graphite anodes of which the dimensions are 190 x 250 x 10 mm. and 4 cathodes of brass, the dimensions of which were 200 x 250 x 1 mm. For 2 days there was passed through the electrolytic bath a current of 0.6 ampere at −210 millivolts, this potential being measured on a calomel electrode. After this first electrolysis, during the course of which the copper and bismuth were deposited, the bath was flowed into another tank containing 2 platinum electrodes acting as anodes and 3 platinum electrodes acting as cathodes of which the dimensions were 250 x 200 x 0.3 mm. The second electrolysis proceeded at a potential of −320 millivolts, being constant, the current being 6 amperes at the beginning and 1.2 amperes at the end of the electrolysis.

After 6 days there was recovered 810 grams of antimony by removal from the cathode and this was attacked in the cold by means of 2.5 liters of commercial nitric acid, chemically pure. A precipitate of antimony oxide formed and was removed and washed with boiling water, then dissolved in 4 liters of 11 N chemically pure HCl. The product of this acid attack was distilled fractionally until the temperature reached 220° C., this final temperature being maintained for about 5 minutes before arresting the distillation. The antimony chloride recovered from the distillation, free from arsenic, containing about 800 grams of antimony, was dissolved in 3.3 N sulfuric acid and 1.5 N hydrochloric acid so as to prepare 20 liters of a solution containing 40 grams per liter of antimony. This solution was introduced to a plastic tank of the type described above containing 2 platinum cathodes the dimensions of which were 250 x 200 x 1 mm. and 3 pure graphite anode 27 mm. in diameter and 125 mm. long immersed in HCl—$H_2SO_4$ mixture described above and free from antimony in solution. The anodes were covered by diaphragms of which the diffuse parts were formed by fritted glass plates of fine porosity. The electrolysis was carried out with intensity varying from 5 amperes to 1.1 amperes at a potential difference maintained at −190 millivolts. After 7 days there were recovered 712 grams of high purity antimony which was melted under a layer of potassium cyanide in a quartz crucible having a ground glass valve. The molten antimony was poured under an atmosphere of argon.

The antimony was of very high purity. Spectrographic analysis revealed only 5 parts per million of iron and 1 part per million of copper. It did not reveal any traces of the other impurities such as arsenic, lead, silver, nickel, zinc, tin, mercury, aluminum and bismuth.

The invention contemplates a process for the manufacture of pure antimony which involves the successive steps of electrolysis in tartaric medium at low potential to eliminate impurities such as copper and bismuth, a second tartaric electrolysis under high potential which deposits antimony and arsenic, followed by a dissolving and a distillation which eliminates the arsenic, and finally an electrolysis which separates the antimony from the residual impurities. In carrying out this process one starts with $Sb_2O_3$ which is dissolved in aqueous tartaric acid, the solution being subjected to low intensity electrolysis on the order of 0.6 ampere with a cathode potential near −0.210 volts, then a second electrolysis with higher current preferably on the order of 6 amperes falling to 1.2 amperes and a cathode potential of −0.320 volt. The antimony detached from the cathode containing arsenic was oxidized anew to antimony oxide, $Sb_2O_3$, washed and put in concentrated HCl solution, the arsenic becoming arsenic chloride. The solution thus obtained is fractionally distilled, first eliminating the water—HCl azeotrope and later the arsenic chloride. The antimony trichloride formed during this stage is then subjected to a final electrolysis. During the distillation one may add a small quantity of pure antimony in order to counteract the formation of pentavalent antimony which tends to form during distillation.

The final electrolysis is carried out in a mixture of HCl and $H_2SO_4$, preferably in a solution containing from 10 to 50 grams per liter (e.g. 40 grams) of antimony, under the form of trichloride, in the presence of free hydrochloric acid and free sulfuric acid in concentrations of 1 N to 2 N and 1 N to 4 N, respectively (e.g. 1.5 N and 3.3 N).

The cathode potential may be maintained between −180 and −190 millivolts during this stage and pure antimony, platinum or tantalum cathodes may be used. During the final electrolysis graphite or platinum anodes are used and if one uses platinum one uses a reducing agent such as hydroxylamine. The anode compartments are preferably isolated from the rest of the bath except for diffuse areas and contain the same type of hydrochloric acid and sulfuric acid mixture.

What is claimed is:

1. A method of preparing antimony of high purity which comprises dissolving antimony oxide, $Sb_2O_3$, in an electrolyte and electrolytically separating arsenic and antimony from impurities, transforming the antimony to oxide and adding the antimony oxide containing arsenic to hydrochloric acid and separating the arsenic from the antimony by distillation, dissolving the antimony trichloride in an electrolyte, and electrolytically separating it from residual impurities.

2. The process of claim 1 in which the $Sb_2O_3$ is initially dissolved in tartaric acid.

3. The process of claim 2 in which the first electrolysis includes a first step of electrolysis by weak current in which impurities are deposited and a second step of electrolysis by materially stronger current in which antimony is deposited.

4. The process of claim 3 in which the Sb is oxidized after electrolytic deposition.

5. The process of claim 1 in which the distillation includes a first stage at moderate temperature and a later stage at materially higher temperature.

6. The process of claim 1 in which the distillation includes a first stage at about 130° C. and a later stage at the boiling point of $AsCl_3$.

7. The process of claim 1 in which the final electrolysis is carried out in mixed concentrated HCl and $H_2SO_4$.

8. The process of claim 7 in which the final electrolysis is carried out at a cathode potential between about 180 and 190 millivolts and current densities of 1 to 5 milliamperes/cm.$^2$.

9. The process of claim 7 in which the final electrolysis is carried out between a pure graphite anode and a cathode of pure metal of the type of Sb, Pt, and Ta.

10. The process of claim 4 in which the later stage of distillation is carried out in the presence of pure metallic Sb.

11. The process of claim 7 in which the concentration of antimony, under the form of trichloride, is from 10 to 50 g./l. Sb in the HCl, $H_2SO_4$ solution of 1 N to 2 N and 1 N to 4 N respectively.

12. The process of claim 11 in which the concentration of Sb is about 40 g./l. in HCl and $H_2SO_4$ of 1.5 N and 3.3 N respectively and the temperature is about 25° to 30° C.

13. A method of preparing antimony in high purity that comprises dissolving $Sb_2O_3$ in tartaric acid, electrolyzing the solution with weak current on the order of .6 ampere and 0.210 volt at the cathode, and thus removing Cu and Bi, electrolyzing the residual solution with stronger current on the order of 0.320 volt and from about 6 to about 1.2 ampere, removing the electrolytic Sb and As, oxidizing the electrolytic Sb with As in pure commercial $HNO_3$, dissolving the $Sb_2O_3$ in pure, concentrated HCl, fractionally distilling the As-contaminated Sb solution until the temperature 220° C. is reached, thereby substantially eliminating arsenic, dissolving the residue, substantially composed of $Sb_2O_3$, in mixed, concentrated HCl and $H_2SO_4$, electrolyzing the solution with potential between .180 and .190 volt and 1 to 5 milliamperes/cm.$^2$, and isolating the pure Sb.

14. A method of preparing antimony of high purity which comprises dissolving $Sb_2O_3$ in tartaric acid, removing Bi and Cu from the solution by electrolysis with weak current, removing Sb and As from the residual solution by electrolysis with materially stronger current, oxidizing the antimony to $Sb_2O_3$ with $HNO_3$, acidifying the As to $AsCl_3$ with HCl, distilling off the water-HCl azeotrope and some $AsCl_3$, adding metallic Sb to the remaining solution, distilling off the residue of the $AsCl_3$ at 220° C., dissolving the Sb in mixed concentrated HCl and $H_2SO_4$, and electrolyzing the solution with power capable of depositing pure Sb on the cathode.

References Cited in the file of this patent

UNITED STATES PATENTS

| 2,224,814 | Gilbert | Dec. 10, 1940 |
| 2,258,963 | Woll et al. | Oct. 14, 1941 |
| 2,392,868 | Stuart | Jan. 15, 1946 |
| 2,713,555 | Neely | July 19, 1955 |
| 2,860,100 | Krzyszkowski | Nov. 11, 1958 |

FOREIGN PATENTS

| 6,882 of 1889 | Great Britain | May 24, 1890 |

OTHER REFERENCES

Betts: Journal of the Electrochemical Society, volume 28, 1915, pages 325–338.